Patented Aug. 22, 1944

2,356,479

UNITED STATES PATENT OFFICE 2,356,479

POLYVINYL ACETAL RESINS

Donald R. Swan, Rochester, N. Y., assignor to Eastman Kodak Company, Rochester, N. Y., a corporation of New Jersey No Drawing. Application September 12, 1940, Serial No. 356,501

10 Claims. (Cl. 260—73)

This invention relates to polyvinyl acetal resins, and more particularly to polyvinyl acetal resins in which at least a part of the acetal groups are alkoxyacetaldehyde acetal groups.

A number of different kinds of polyvinyl acetal resins are known and these always contain a larger or smaller hydroxyl group content. When the hydroxyl group content is large, the resins are soluble in cold water, but insoluble in hot. Such cold water-soluble resins are of considerable utility in the sizing of paper and as substitutes for gelatin in the preparation of photographic emulsions. However, such cold water-soluble resins suffer the disadvantage of having rather high melting points, owing to their large hydroxyl group contents.

I have now found a new kind of polyvinyl acetal resin which is cold water-soluble and which is more thermoplastic than the previously known cold water-soluble polyvinyl acetal resins. It is, accordingly, an object of my invention to provide new resins. A further object is to provide a process for preparing such resins. Other objects will become apparent hereinafter.

In accordance with my invention, I react a polyvinyl alcohol or a deesterified polyvinyl ester with an alkoxyacetaldehyde, or a compound which yields alkoxyacetaldehyde, in the presence of an acetal condensation catalyst. According to a preferred embodiment of my invention, I deesterify a polyvinyl ester and concomitantly condense with the deesterified product, an alkoxyaldehyde or a compound which yields an alkoxyaldehyde, in the presence of a deesterification catalyst.

The following examples will serve to demonstrate the manner of practicing my invention. These examples are not intended to limit my invention.

Example 1

24 g. of polyvinyl acetate (viscosity 25) and 20 g. of the diethyl acetal of methoxyacetaldehyde were dissolved in 20 g. of ethyl acetate and 30 g. of 95% ethyl alcohol. To this solution were added 2.1 cc. of concentrated sulfuric acid (sp. g. 1.84) dissolved in 4 cc. of water. The resulting mixture was allowed to stand at 30° C. for about seven days. The reaction mixture was then poured into warm (50° C.) water to precipitate the resin. In this manner, the resin was obtained as a white, fibrous material, which, like other water susceptible colloidal materials, darkened in color upon being allowed to dry in the air. The resin contained a hydroxyl group content equivalent to about 11% by weight of polyvinyl alcohol and an acetate group content equivalent to about 1.4% by weight of polyvinyl acetate. In a similar manner, a cold water-soluble resin can be prepared using ethoxyacetaldehyde instead of methoxyacetaldehyde.

Example 2

44 g. of polyvinyl alcohol (high viscosity) were dissolved in 500 cc. of water. To the resulting solution, 148 g. of the diethyl acetal of methoxyacetaldehyde and 50 cc. of concentrated (sp. g. 1.18) hydrochloric acid were added. The resulting solution was heated about three-quarters of an hour on a steam bath with stirring, and then allowed to stand for about 12 hours at 20° to 25° C. The reaction mixture had separated into two layers, at the end of this time. The reaction mixture was then stirred up to give a fairly homogeneous mixture which was allowed to stand at 20° to 25° C. for four further hours. At the end of this time, sufficient 3N aqueous potassium hydroxide to neutralize the acid, was added. The resin was salted out by this procedure and precipitated. It was removed from the reaction mixture, washed with hot water, then with butyl alcohol and finally with diethyl ether. The resin was then dried by heating at 45° C. in vacuo. The resin was soluble in 95% ethyl alcohol and in ice water. It was insoluble in hot water and in diethyl ether. An aqueous solution of the resin is compatible with gelatin. An aqueous solution of the resin and gelatin gave a clear film, when coated on a film-forming surface and allowed to dry.

Example 3

22 g. of polyvinyl alcohol (medium viscosity) was mixed with 250 cc. of 1,4-dioxane and 250 cc. of 95% ethyl alcohol. To the resulting mixture, 11 g. of paraldehyde, 22 g. of the diethyl acetal of ethoxyacetaldehyde and 10 cc. of hydrochloric acid (sp. g. 1.18) were added. This mixture was heated at 80° C. for 24 hours. At the end of this time, the polyvinyl alcohol which was originally insoluble had completely dissolved, and the reaction mixture was a homogeneous viscous solution. The resin was precipitated by pouring the reaction mixture into warm water at about 70° C. The resin was washed in water at the same temperature and finally dried at 55° C. The resulting white resin was easily soluble in cold water, and in organic solvents, such as acetone and ethyl alcohol. The resin contained a hydroxyl group content equivalent to about 16% by weight of polyvinyl alcohol.

My new resins can be employed to size paper, and as substitutes for gelatin in the preparation of photographic silver halide emulsions.

What I claim as my invention and desire to be secured by Letters Patent of the United States is:

1. A polyvinyl acetal resin in which at least a part of the acetal groups are alkoxyacetaldehyde acetal groups selected from the group consisting of methoxyacetaldehyde and ethoxyacetaldehyde acetal groups.

2. A polyvinyl acetal resin in which at least a part of the acetal groups are methoxyacetaldehyde acetal groups.

3. A polyvinyl acetal resin in which at least a part of the acetal groups are ethoxyacetaldehyde acetal groups.

4. A polyvinyl acetal resin in which the acetal groups are methoxyacetaldehyde acetal groups.

5. A polyvinyl acetal resin in which the acetal groups are ethoxyacetaldehyde acetal groups.

6. A process for preparing a polyvinyl acetal resin comprising deesterifying a polyvinyl ester, in the presence of an alkoxyacetaldehyde selected from the group consisting of methoxyacetaldehyde and ethoxyacetaldehyde and a deesterification catalyst.

7. A process for preparing a polyvinyl acetal resin comprising deacetylating a polyvinyl acetate, in the presence of an acid deesterification catalyst and an alkoxyacetaldehyde selected from the group consisting of methoxyacetaldehyde and ethoxyacetaldehyde.

8. A process for preparing a polyvinyl acetal resin comprising deacetylating a polyvinyl acetate, in the presence of hydrochloric acid and an alkoxyacetaldehyde selected from the group consisting of methoxyacetaldehyde and ethoxyacetaldehyde.

9. A process for preparing a polyvinyl acetal resin comprising deacetylating a polyvinyl acetate, in the presence of an acid deesterification catalyst and methoxyacetaldehyde.

10. A process for preparing a polyvinyl acetal resin comprising deacetylating a polyvinyl acetate, in the presence of an acid deesterification catalyst and ethoxyacetaldehyde.

DONALD R. SWAN.